United States Patent [19]

McFadden

[11] Patent Number: 4,527,812
[45] Date of Patent: Jul. 9, 1985

[54] CROSSBEAM SUPPORT PAD FOR TOWABLE VEHICLE

[75] Inventor: James R. McFadden, Highland, Mich.

[73] Assignee: General Motors Corporation, Detroit, Mich.

[21] Appl. No.: 442,258

[22] Filed: Nov. 17, 1982

[51] Int. Cl.³ .............................................. B60P 3/06
[52] U.S. Cl. ................................... 280/402; 280/480; 414/563
[58] Field of Search ............. 280/402, 179 R, 179 A, 280/1, 480; 414/563

[56] References Cited

U.S. PATENT DOCUMENTS 4,010,858  3/1977  Mahnke, Jr. ..................... 280/402
4,201,399  5/1980  Carr, Jr. et al. .................. 280/402

Primary Examiner—Joseph F. Peters, Jr.
Assistant Examiner—Donn McGiehan
Attorney, Agent, or Firm—Charles E. Leahy

[57] ABSTRACT

A pair of laterally spaced support pads are attached to the understructure of the front end of a towage vehicle for engagement by a crossbeam adapted to fit between the vehicle understructure and the towing chain extending from a wrecker towing sling tow bar to the vehicle body behind the wheels. Each support pad includes an upper surface adapted for engagement against the vehicle understructure and the lower surface spaced vertically below the upper surface at a distance which positions crossbar to route the tow sling to eliminate or lessen the interference with the vehicle front end which would otherwise result from engagement of the crossbeam directly upon the understructure of the towed vehicle. A flange portion depends from the lower surface of the pad and is adapted for engagement by the crossbeam to assure a certain longitudinal positioning of the crossbeam. Thus, the support pads locate the crossbeam at a certain longitudinal position and vertical spacing below the vehicle understructure to minimize damage to the front end of the towed vehicle by the towing sling.

3 Claims, 4 Drawing Figures

CROSSBEAM SUPPORT PAD FOR TOWABLE VEHICLE

The invention relates to a motor vehicle towable by a wrecker and provides support pads attached to the underside of the vehicle bumper impact bar to precisely locate the wooden crossbeam used in conjunction with the towing sling and minimize damage to the front end of the towed vehicle.

BACKGROUND OF THE INVENTION

Motor vehicles are conventionally towed by a wrecker having towing equipment including a sling comprised of a pair of flexible sling belts. The upper ends of the sling belts are raised and lowered by a hoist mounted on the wrecker and the lower ends of the belts are connected to a transverse extending tow bar. A pair of spacer bars extend between the tow bar and the wrecker to position the sling belts rearwardly of the wrecker.

A vehicle to be towed is connected to the wrecker by sling chains which extend from the tow bar to slots provided in the floor pan of the towed vehicle just behind the front wheels. A wooden crossbeam is positioned across the sling chains and engages with the appropriate understructure of the vehicle such as a bumper impact bar or the radiator support. The wrecker hoist is then operated to raise the sling belts and tow bar so that the front end of the towed vehicle is lifted off the ground. The proper longitudinal positioning of the crossbeam assures that the sling belts will not bear with excessive loading upon the front end structure of the vehicle and abrade or otherwise damage the front end.

Many vehicles of modern manufacture have a front end structure such as a plastic bumper fascia which substantially overhangs the bumper impact bar or the radiator core support. Other vehicles have an aerodynamic air dam of flexible plastic underhanging the vehicle front end. Accordingly, conventional placement of the crossbeam against the radiator support or the radiator core support may result in a crossbeam location which results in the belt slings contacting the front end structure with such a degree of interference that abrasion or other damage to the front end structure may result. Furthermore, the crossbeam itself may have excessive interference with the air dam. Accordingly, it would be desirable to assure that the placement of the crossbeam will consistently and reliably route the belt slings for minimized interference with the front end structure of the towed vehicle.

SUMMARY OF THE INVENTION

According to the invention a crossbeam adapted to fit between the understructure of the vehicle and the towing chains extending from the towing sling tow bar to the vehicle body behind the wheels is engaged against a pair of support pads attached in laterally spaced relation upon the bumper impact bar or the radiator core support of the towed vehicle understructure. Each support pad includes an upper surface adapted for engagement against the vehicle understructure and a lower surface spaced vertically below the upper surface and adapted to be engaged by the crossbeam. The vertical spacing between the upper and lower surface of the support pad routes the tow sling to eliminate or lessen the interference with the vehicle front end which would otherwise result from engagement of the crossbeam directly upon the understructure of the towed vehicle. A flange portion depends from the lower surface at the rear end thereof and is adapted for engagement by the crossbeam to assure a certain longitudinal positioning of the crossbeam.

Accordingly, the object, feature and advantage of the invention resides in the provision of a support pad for attachment upon the understructure of the towed vehicle to assure a predetermined longitudinal positioning of the crossbeam and space the crossbeam vertically further below the vehicle front end to route the tow sling in a manner to minimize the potential damage to the front end of the towed vehicle by the tow sling.

DESCRIPTION OF THE DRAWING

These and other objects, features and advantages of the invention will become apparent upon consideration of the specification and the appended drawings in which.

DESCRIPTION OF THE PREFERRED EMBODIMENT

Figure 1:
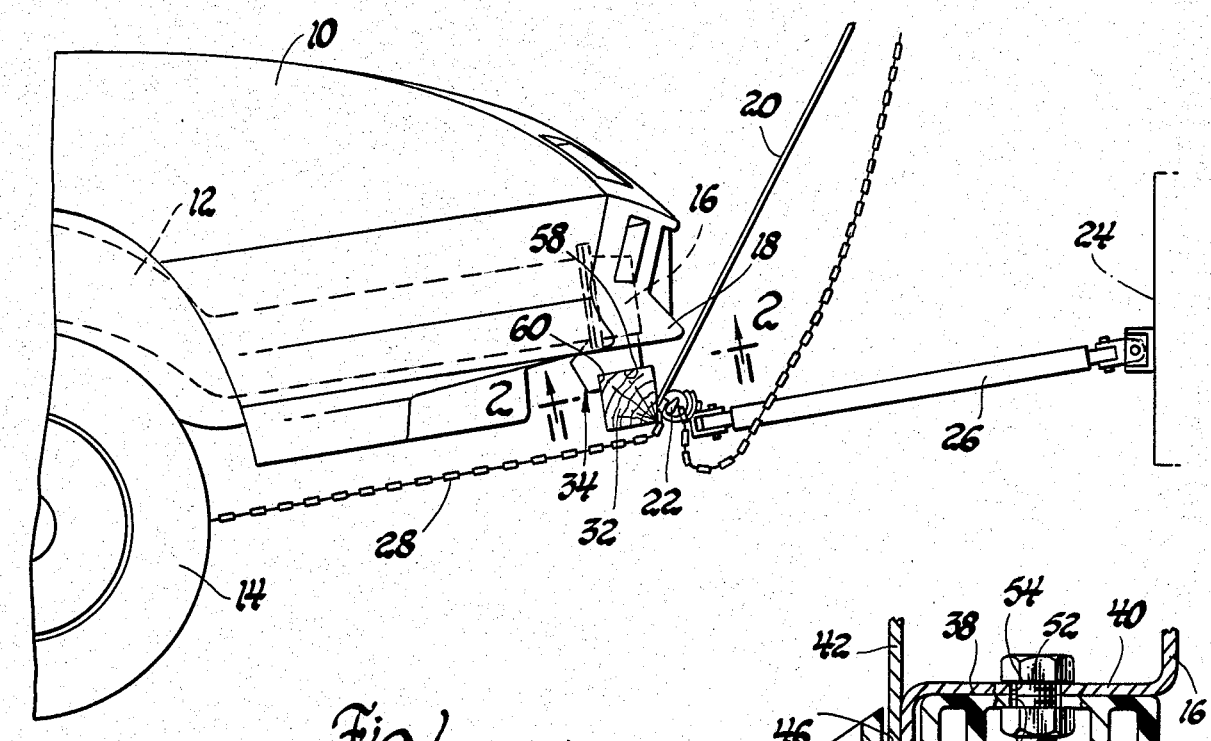
FIG. 1 is a side elevation view of a towed vehicle having a crossbeam support pad according to the invention.

Referring to FIG. 1, there is shown a towed vehicle 10 having a frame 12 which carries a front wheel 14 and a bumper impact bar 16. The bumper impact bar 16 mounts a crushable energy absorbing structure which is covered by a flexible plastic bumper fascia 18.

FIG. 1 shows the vehicle 10 being towed by a wrecker having conventional towing sling equipment. The towing sling equipment includes a pair of belt slings, one of which is shown at 20, extending between a hoist mounted on the wrecker and a transverse extending tow bar 22. The tow bar 22 is held rearwardly of the back plate 24 of the wrecker by a pair of spacer bars, one of which is shown at 26. The tow bar 22 of the towing sling is connected to the vehicle by a pair of chain slings, one of which is shown at 28. The chain slings 28 extend from the tow bar 22 and are connected to slots in the bottom of the floor pan just behind the front wheel 14. A crossbeam 32, shown as a wooden timber, is positioned across the chain slings 28 just under the bumper impact bar 16.

According to the invention, a pair of crossbeam support pads, one of which is shown at 34, are attached to the underside of the bumper impact bar 16 to position the crossbeam 32.

Figure 2:
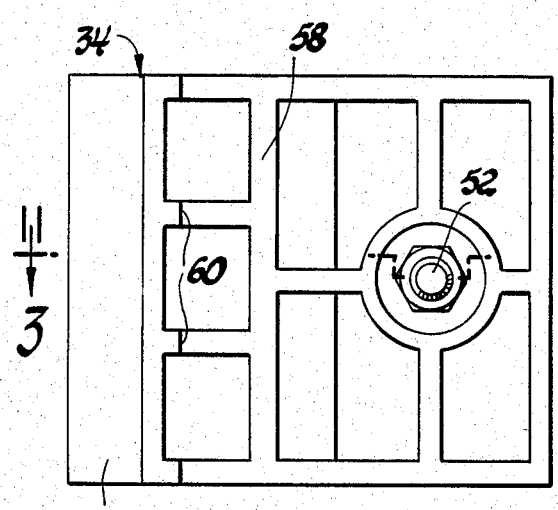
FIG. 2 is a view of the support pad taken in the direction of arrows 2—2 of FIG. 1.
Figure 3:
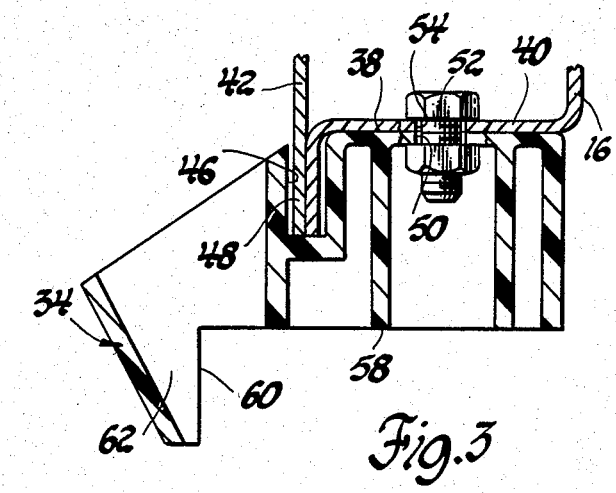
FIG. 3 is a sectional view of the support pad taken in the direction of arrows 3—3 of FIG. 2.
Figure 4:
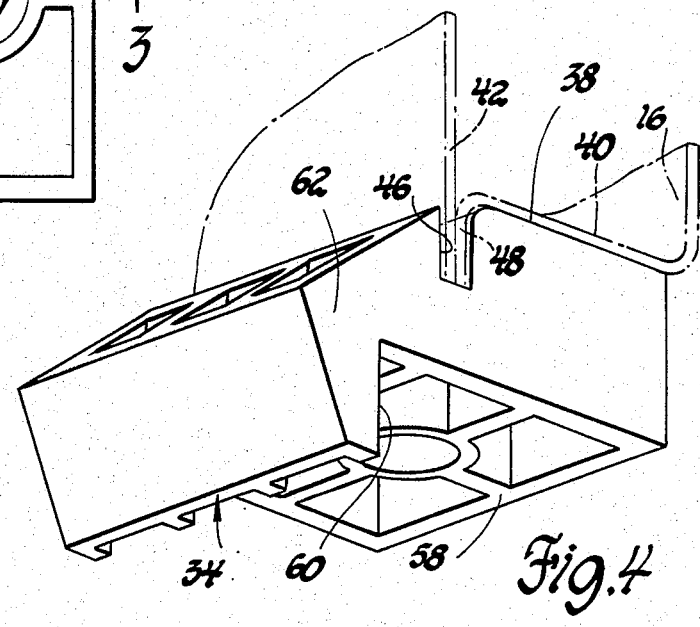
FIG. 4 is a perspective view of the support pad.

As best seen in FIGS. 2, 3 and 4 the support pad 34 is an injection molded plastic member having an upper surface 38 which engages against a bumper member 40 which cooperates with a bumper member 42 to define the bumper impact bar 16. The support pad 34 also has a transverse extending recess 46 in the upper surface 38 which receives a pinch-weld flange 48 by which the members 40 and 42 of the bumper impact bar 16 are connected together. The recess 46 and the pinch-weld flange 48 cooperate to locate and maintain the longitudinal position of the support pad 34 relative to the bumper impact bar 16. A hole 50 is provided in the upper surface 38 of the support pad 34 and receives a nut and bolt assembly 52 which extends through an aligned hole 54 in the member 40 to attach the support pad 34 to the bumper impact bar 16.

The support pad 34 also has a lower surface 58 and a vertical extending abutment face 60 defined by a flange portion 62 depending downwardly from the lower surface 58 at the rear end thereof. The lower surface 58 and the abutment face 60 cooperate to receive and precisely locate the crossbeam 32 in the position shown in FIG. 1.

The injection molded support pad 34 has a plurality of recesses and stiffening ribs therein as shown in FIGS. 2, 3 and 4 which provide adequate strength and yet minimize the amount of molding material required to form the support pad.

As seen in FIG. 1, lower surface 58 and abutment face 60 of the support pad 34 cooperate to define a pocket which locates the crossbeam 32 at a precise longitudinal position and at a vertical spacing further below the front end of the vehicle than would otherwise be provided by a direct engagement of the crossbeam with the impact bar 16. Thus, the crossbeam position established by the support pad of FIG. 1 functions to locate the sling belts 20 further forward than would otherwise result so that the abrasion of the belt against the bumper fascia 18 is minimized. Furthermore, the crossbeam is positioned in a manner to minimize its interference with the flexible plastic air dam or similar structure which extends substantially below the bumper impact bar 16 in many vehicles.

Referring to the drawings, it will be understood that the size and dimension of the support pad may be varied to suit the front end configuration of a particular vehicle. For example, the vertical placement of the crossbeam is determined by the vertical spacing between the upper surface 38 and lower surface 58 of the support pad 34. The longitudinal location of the abutment face 60 will determine the longitudinal position of the crossbeam relative the front end of the towed vehicle. Furthermore, it will be understood that the support pad assembly of this invention may be affixed to the radiator core support, the bumper impact bar, or equivalent suitable understructure of the vehicle body.

Thus, it is seen that the invention facilitates the towing of a motor vehicle and minimizes the possible damage to the front end of the vehicle by the towing equipment.

The embodiments of the invention in which an exclusive property or privilege is claimed are defined as follows:

1. In a motor vehicle towable by towing equipment having a towing sling and a crossbeam adapted to fit between the understructure of the vehicle and the towing chains extending from the towing sling to the vehicle underbody to minimize damage to the front end of the towed vehicle, the improvement comprising:

a support pad adapted for attachment upon the understructure of the vehicle and having an upper surface adapted for engagement with the understructure and a lower surface spaced vertically below the upper surface and adapted to be engaged by the crossbeam, and said support pad having means adapted for engagement by the crossbeam to establish the crossbeam at a certain longitudinal position whereby the pad assembly locates the crossbeam to route the towing sling in lesser interference with the vehicle front end than otherwise provided by engagement of the crossbeam directly upon the underside of the vehicle to minimize damage to the front end of the towed vehicle by the towing equipment.

2. In a motor vehicle towable by towing equipment having a towing sling and a crossbeam adapted to fit between the understructure of the vehicle and the towing chains extending from the towing sling to the vehicle underbody, the improvement comprising:

a support pad having an upper surface adapted for attachment upon the underside of the front bumper impact bar, a lower surface spaced vertically below the upper surface and adapted to be engaged by the crossbeam, and a flange portion, depending from the lower surface and adapted for engagement by the crossbeam whereby the pad assembly flange portion assures a predetermined longitudinal positioning of the crossbeam and the vertical spacing between the pad assembly upper and lower surfaces routes the towing sling for lessened interference with the vehicle front end than otherwise resulting by engagement of the crossbeam directly upon the underside of the bumper impact bar to minimize damage to front end of the towed vehicle by the tow chains.

3. In a motor vehicle towable by towing equipment having a towing sling and a crossbeam adapted to fit between the understructure of the vehicle and the towing chains extending from the towing sling to the vehicle underbody, the improvement comprising:

a support pad having an upper surface and a lower surface spaced vertically below the upper surface, means attaching the support pad to the underside of the front bumper impact bar, means depending from the lower surface and cooperating with the lower surface to define a pocket for engagement by the crossbeam whereby the crossbeam is positioned at a predetermined longitudinal location and vertical spacing relative the understructure to route the towing sling in a manner reducing the potential for damage to the front end of the towed vehicle.

* * * * *